United States Patent
Weigmann et al.

(10) Patent No.: US 9,403,442 B2
(45) Date of Patent: Aug. 2, 2016

(54) TECHNIQUE FOR DISCHARGING AN ENERGY STORAGE OF A VEHICLE

(75) Inventors: Walter Weigmann, Fürth (DE); Wolfgang Templ, Sersheim (DE)

(73) Assignee: Alcatel Lucent, Boulogne-Billancourt (FR)

( * ) Notice: Subject to any disclaimer, the term of this patent is extended or adjusted under 35 U.S.C. 154(b) by 180 days.

(21) Appl. No.: 14/355,278

(22) PCT Filed: Sep. 6, 2012

(86) PCT No.: PCT/EP2012/067423
§ 371 (c)(1),
(2), (4) Date: Apr. 30, 2014

(87) PCT Pub. No.: WO2013/068149
PCT Pub. Date: May 16, 2013

(65) Prior Publication Data
US 2014/0247017 A1    Sep. 4, 2014

(30) Foreign Application Priority Data
Nov. 10, 2011    (EP) .................................... 11306468

(51) Int. Cl.
*H01M 10/44* (2006.01)
*H01M 10/46* (2006.01)
*B60L 11/18* (2006.01)
*H02J 7/00* (2006.01)

(52) U.S. Cl.
CPC ......... *B60L 11/1851* (2013.01); *B60L 11/1842* (2013.01); *B60L 2270/36* (2013.01); *H02J 7/0029* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
CPC    H02J 7/0029; H02J 2007/0049; H02J 7/1446
USPC ......... 320/104, 114, 134, 136, 135; 701/29.1, 701/29.4, 29.6, 29.8
See application file for complete search history.

(56) References Cited

U.S. PATENT DOCUMENTS

| 5,871,858 | A | 2/1999 | Thomsen et al. | |
|---|---|---|---|---|
| 6,993,421 | B2 * | 1/2006 | Pillar | A62C 27/00 701/29.4 |
| 7,184,866 | B2 * | 2/2007 | Squires | A62C 27/00 701/29.4 |
| 2011/0185197 | A1 | 7/2011 | Ukita et al. | |

FOREIGN PATENT DOCUMENTS

| CN | 200947552 | 9/2007 |
|---|---|---|
| CN | 201752075 | 2/2011 |

(Continued)

*Primary Examiner* — Edward Tso
(74) *Attorney, Agent, or Firm* — Patti & Malvone Law Group, LLC

(57) ABSTRACT

A technique for discharging an energy storage of a vehicle having a predetermined discharge limit threshold comprises performing a lookup in a database to determine whether a predetermined condition is met. The predetermined condition comprises a specific vehicle identification number being listed in the database. Next, initiating the discharging of the energy storage below a predetermined discharge limit threshold depending on a result of the lookup in the database.

17 Claims, 2 Drawing Sheets

(56) References Cited

FOREIGN PATENT DOCUMENTS

| GB | 95/35228 | 12/1995 |
| GB | 2321749 | 8/1998 |
| GB | 2474305 | 4/2011 |
| JP | H04145846 | 5/1992 |
| JP | 2008221880 | 9/2008 |
| JP | 2011055589 | 3/2011 |
| JP | 2011227557 | 11/2011 |
| KR | 20080003905 | 1/2008 |

* cited by examiner

TECHNIQUE FOR DISCHARGING AN ENERGY STORAGE OF A VEHICLE

FIELD OF THE INVENTION

The invention is based on a priority application EP11306468.7 which is hereby incorporated by reference.

The invention relates to a method, a control module, a system, a computer program and a computer program product for discharging an energy storage of a vehicle, in particular an electrical battery of an electric vehicle, having a predetermined discharge limit threshold in particular below the maximum capacity of said energy storage.

BACKGROUND

In an implementation for discharging energy storage of a vehicle, in particular an electrical battery of an electric vehicle, discharging is performed while said energy storage is connected to a supply network for discharging not below a predetermined discharge limit threshold. This way it is guaranteed that the energy storage or in this example the electrical battery of the electric vehicle, are not discharged beyond a certain capacity in order to guarantee a minimum range for the vehicle to move. Typically in such implementations, said electrical battery is used as a temporary energy storage for a local power grid in order to restore excessively produced electrical energy from said electrical battery in times the vehicle is not moved and to feed back electrical energy from the electrical battery to said local power grid in times when the demand in the local power grid exceeds the currently produced electrical energy. This way, the electrical battery is charged for example during night time when no other consumers of electrical energy are demanding excessive electrical energy from said local power grid and electrical energy is fed back from said electrical battery to said electrical power grid for example during lunch time when many electrical vehicles are parked and many people prepare lunch using the electric devices.

The predetermined discharge limit threshold in this case is used to avoid discharging single energy storages of single vehicles beyond a guaranteed limit in order to allow all vehicles that participate in the local electric power grid to maintain a minimum driving range. The predetermined discharge limit threshold is for example set to 80% of the maximum capacity of the electrical battery.

However, in certain circumstances it may be useful to allow discharging of the electrical battery beyond said predetermined discharge limit threshold.

SUMMARY

The object of the invention is thus to discharge an energy storage of a vehicle, in particular an electrical battery of an electric vehicle, having a predetermined discharge limit threshold in particular below a maximum capacity of said energy storage wherein a test to determine whether a predetermined condition is met is performed and said energy storage is discharged below said predetermined discharge limit threshold, depending on the result of said test. This way, only in predetermined situations, for example theft of a particular vehicle or during an emergency situation in the local power grid, the full capacity of the battery of the stolen vehicle or the full capacity of all connected electrical batteries may be discharged.

Advantageously, information about said vehicle is sent in particular from a control module mounted on said vehicle to a server of a supply system wherein said condition depends on inside information about said vehicle and said result of said test sent in particular from said server to said control module. This way, the efficiency of the method is increased due to the fact that said supply system comprises the means to perform the test. Also information for performing said test, for example about said predetermined conditions, can be updated in the supply system side for individual vehicles, independent from their connection stages. In particular, information about stolen vehicles can be a loaded into the supply system servers in order to discharge the electrical batteries of a stolen vehicle upon next connection to a particular supply system.

Advantageously, energy is supplied to said energy storage only if said condition is not valid. This way, not only the discharging of electrical batteries is triggered but also charging of empty batteries of vehicles that meet the condition is not allowed.

Advantageously, said control module comprises means adapted to make a non-destructive modification of said control unit difficult. This way, fraud or theft is made more difficult.

Advantageously, said condition is met if information indicating theft of the vehicle is available. This way, a particular vehicle, that is registered to be stolen, may be stopped or prevented from continuing movement by discharging its electrical battery.

Advantageously, said condition is met in case information about an energy demand of a local supply network to which said energy storage is connected exceeds available energy supply, in particular in an emergency situation. This way, the predetermined discharge limit threshold may be disregarded in cases of emergency.

Further developments of the invention can be gathered from dependent claims and the following description.

BRIEF DESCRIPTION OF THE FIGURES

In the following the invention will be explained further making reference to the attached drawings.

DESCRIPTION OF THE EMBODIMENTS

Figure 1:
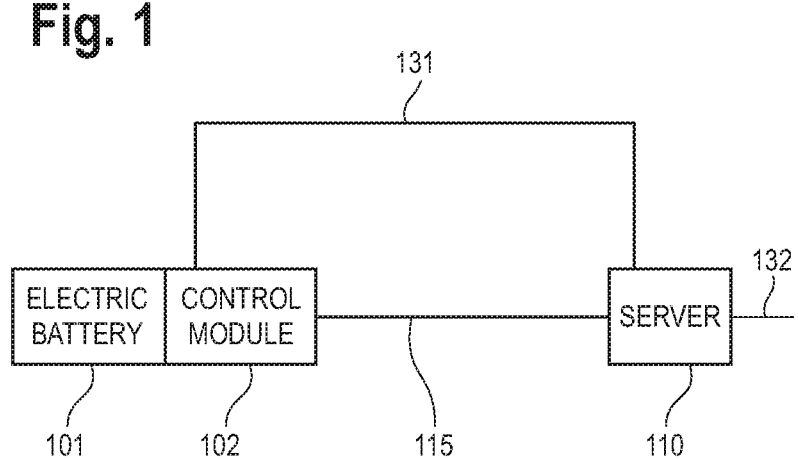
FIG. 1 schematically shows part of a system for discharging an energy storage.

FIG. 1 shows part of the system for discharging energy storage of a vehicle in particular an electrical battery of an electric vehicle.

According to a first example an energy storage of an electrical vehicle is discharged via a power supply system. This allows to forcefully discharge a stolen electric vehicle's battery or to feed back the power to the power supply system, e.g. in case of emergency demand in the power supply system.

Said system comprises according to said first example a server 110.

Said electrical vehicle comprises said energy storage for example an electric battery 101 and a control module 102.

Said power supply system comprises said server 110, a permanent supply line, for example a permanent power line 132, leading to a local power grid and a retractable supply line, for example a retractable power cord 131. Said retractable supply line and said permanent supply line are connectable to each other on one end of the respective line.

Figure 2:
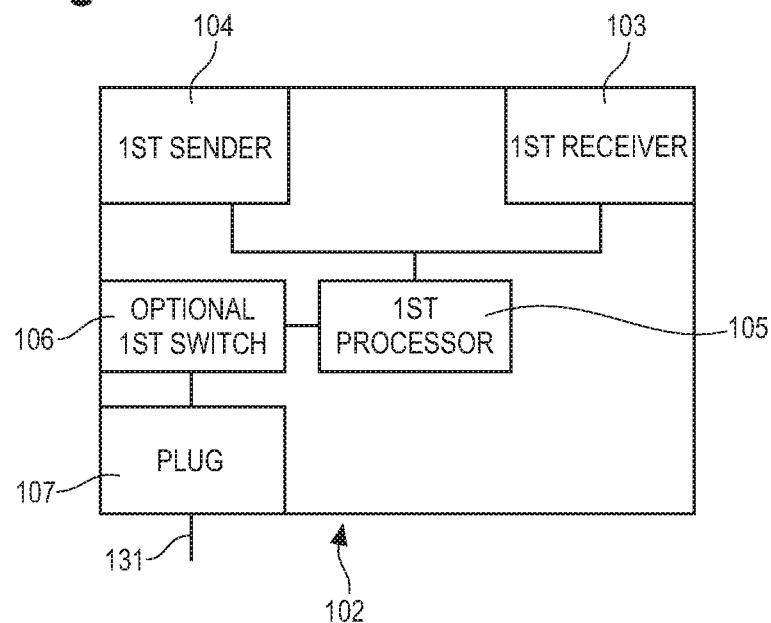
FIG. 2 schematically shows part of a control module.

Said control module 102 is described further making reference to FIG. 2. Said control module 102 comprises an optional first receiver 103, a first sender 104 a first processor 105, an optional first switch 106 and a plug 107.

Furthermore said retractable power cord 131 is adapted to connect to said electric battery 101 via said plug 107. For example said retractable power cord 131 comprises a connector fitting said plug 107.

Said first processor 105 is adapted to switch said first switch 106.

Said first switch 106 is adapted to connect said plug 107 to said electrical battery 101. Said first processor 105 is adapted to switch said first switch 106 in a way to allow either charging or discharging of said battery 101 when said retractable power cord 131 is plugged into said plug 107.

Figure 3:
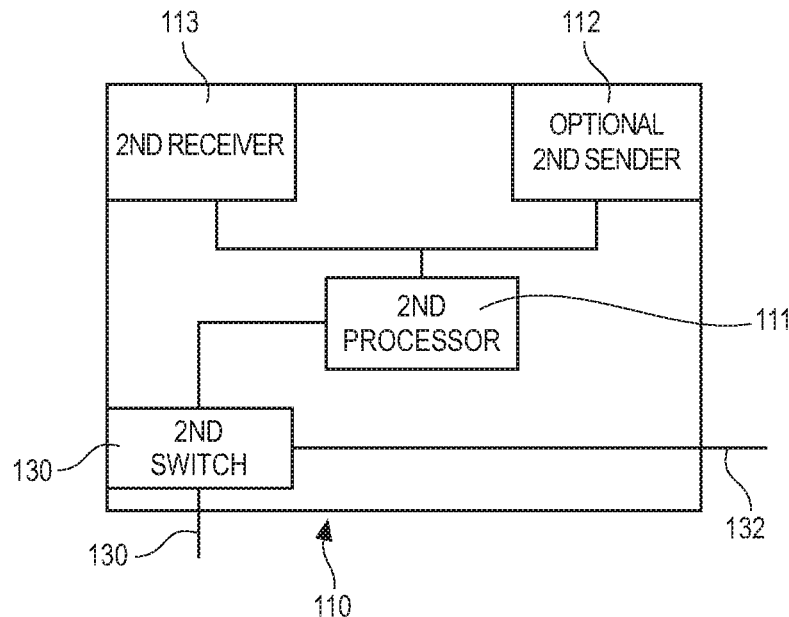
FIG. 3 schematically shows part of a server.

Said server 110 is described further making reference to FIG. 3.

Said server 110 comprises a second processor 111, an optional second sender 112, a second receiver 113 and a second switch 130.

Said second processor 111 is adapted to switch said second switch 130.

Said second switch 130 is adapted to connect said battery 101 to said permanent power line 132 via said retractable power cord 131 when said retractable power cord 131 is plugged into said plug 107. Said second processor 111 is adapted to switch said second switch 130 in a way to either allow charging or discharging of said electrical battery 101 when said retractable power cord 131 is plugged into said plug 107 and said first switch 106 is in the appropriate position for charging or discharging.

Said first sender 104 is adapted to send information about said vehicle to said second receiver 113 of said server 110 via said data link 115. For example said first sender 104 is adapted to send a message comprising an identifier, for example a vehicle identification number VIN to said second receiver 113 in a message.

According to said first example, said optional second sender 112 is adapted to send additional information, e.g. a confirmation of the receipt of said information about said vehicle to said optional first receiver 103. Consequently said optional first receiver 103 is adapted to receive such request. Furthermore in this example said first processor 105 is adapted to trigger a retransmission of said information in predetermined time intervals until said additional information is received, e.g. until said confirmation is received.

Said first receiver 103 and second receiver 113 are adapted to receive the respective messages from the respective senders 112 and 104.

Said messages are for example transmitted via said data link 115. Said data link 115 is for example an Ethernet connection over said retractable power cord 131 or may be any other type of data link e.g. according to the well known IEEE811.2 standard.

According to the example said switches 106 and 130 are electrical switches. Furthermore, said energy storage, according to the example, is said electric battery 101. Said control module 102 is adapted to monitor a predetermined discharge limit threshold. Said predetermined discharge limit threshold is for example definable by a user of said electric vehicle via a user interface in said vehicle not depicted in FIG. 1.

Said predetermined discharge limit threshold is for example stored as a percentage of a maximum capacity of said electrical battery 101 in said control module 102. To that end, said control module 102 comprises a storage not depicted in FIG. 1.

Monitoring of said battery 101 below said predetermined discharge limit threshold means in this case that discharging of said electrical battery 101 is prevented by said control module 102. To that end said control unit 102 comprises for example a software program executing permanently on said first processor 105, while said electrical vehicle is connected to a power supply system via said retractable power cord 131. To that end, said first processor 105 is adapted to determine when said electric battery 101 has been discharged down to or slightly below said predetermined limit threshold and in this case send a message to said server 110 via said data link 115, indicating that further discharging of said electrical battery 101 is not possible due to the fact that said predetermined discharge limit threshold has been reached.

Said server 110 is adapted to perform a test to determine whether a predetermined condition is met. For example, said test comprises in a database lookup, using the information about said vehicle, received from said control module 102. For example, said server 110 is adapted to look up said vehicle identification number VIN in said database in order to determine whether the vehicle having the vehicle identification number VIN is listed in said database. As a prerequisite for example the identification number VIN of a stolen vehicle is stored in said data base or marked as a stolen vehicle.

Additionally, or alternatively said server 110 is adapted to determine whether information is available indicating that an energy demand of a local supply network to which said energy storage, particular said electrical battery 101 is temporarily connected via said retractable power cord 131, exceeds the available energy supply, in particular in an emergency situation. For example, said server 110 is adapted to communicate with a monitoring center of a local power grid via a data link not depicted in FIG. 1 or 3 and to receive information about the current state of said local power grid. In this case, said server 110 is adapted to consider that the predetermined condition is met in case a notification from said monitoring center, indicating an emergency situation, has been received.

Figure 4:
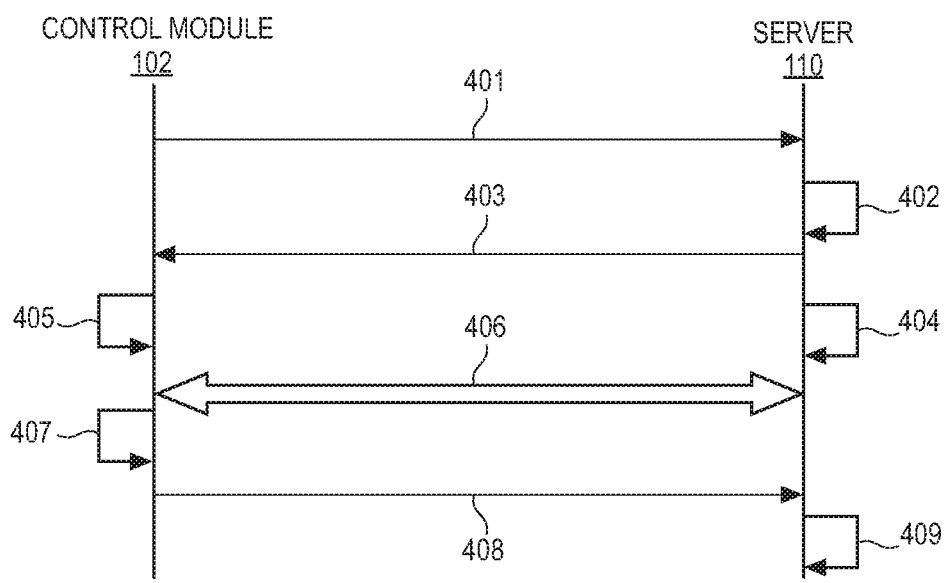
FIG. 4 schematically shows a sequence diagram comprising some steps in a method for discharging an energy storage.

A first method for discharging said energy storage of said vehicle according to said first example is described below making reference to FIG. 4. According to said first method, said energy storage may be charged or discharged depending on the requirements from the power grid. The normal operation allows charging and discharging of the battery 101. Charging is triggered for example upon request by said control module 102. Discharging is triggered for example in response to a local power demand surge. In the latter case discharging is only allowed down to said predetermined discharge level threshold. In normal operation, when said predetermined discharge level threshold is reached, no further discharge of said battery 101 is desirable. Hence charging is triggered in that case. However in particular situations, e.g. in case of a stolen vehicle or when the power grid has an emergency demand, further discharging below said discharge limit threshold is triggered according to said first method.

Said first method starts for example whenever a connection of said retractable power cord 131 and said plug 107 is detected by said control module 102. In this case said control module is adapted to detect the connection, e.g. by said first processor 105 monitoring a mechanical switch that is adapted to send a signal to said first processor 105 whenever it gets triggered. In an example said switch is mounted near said plug 107 in a way to get pressed when said connector of said retractable power cord 131 fitting into said plug 107 is connected to said plug 107.

After the start a message 401 request is sent from said control module 102 to said server 110. Said message 401 is for example a request to charge said electrical battery 101, including information about said vehicle, for example said vehicle identification number VIN. Said message 401 is for example sent frequently at a predetermined time interval, e.g. every second.

Upon receipt of said message 401 in a step 402 a test is performed if said demand for forceful discharging is present, e.g. to determine whether said predetermined condition is met. For example, said vehicle identification number VIN is looked up in said database in order to identify whether the vehicle having said vehicle identification number VIN is registered as a stolen vehicle or not. Alternatively, a test to determine whether said local power grid is in an emergency situation or not is triggered.

Optionally the result of said test, e.g. a confirmation is sent from said server 110 to said control module 102 in a message 403 reply.

Afterwards, in a step 404, said second switch 130 is set to the appropriate state, depending on the result of the test of said condition, performed in said step 402. For example, said second switch 130 is set to allow charging of said electrical battery 101 when said predetermined condition is not met or to a state allowing discharging of said battery 101 in case said predetermined condition is met.

Alternatively or additionally said second switch 130 is set to allow charging only if the result of said test indicates that said power grid is not in an emergency situation and is set to allow discharging if the result indicates that said power grid is in an emergency situation requiring additional power supply from said battery 101. Optionally upon receipt of said message 403 in a step 405 sending of said request to charge said battery 101 is stopped by said control module 102.

After said second switch 130 is set, a power transfer 406 between said electrical battery 101 and said local power grid is established. This means that depending on the switch setting of said second switch 130, said power transfer may be from the power grid to said battery 101 or from said battery 101 to said power grid.

Afterwards, in a step 407, said capacity of said electrical battery 101 is monitored to detect when said electrical battery 101 reaches full capacity or said predetermined discharge limit threshold. For example, said capacity of said electrical battery 101 is monitored in order to determine whether said capacity of said electrical battery 101 is at 100% capacity or above, or on, or below said predetermined discharge limit threshold. In case charging of said battery 101 has been started monitoring of said predetermined discharge limit value may be omitted.

In case said second switch 130 is set to allow charging, charging is interrupted when said electrical battery 101 is full, e.g. charged at 100 percent of its capacity. In case said second switch 130 is set to allow discharge of said electrical battery 101, said discharging of said electrical battery 101 is still interrupted for example when said electrical battery 101 reaches a charging level that is equal to said predetermined discharge limit threshold. For example the discharging of said battery 101 is interrupted by switching said second switch 130 in a way to only allow charging of said battery 101 when said charging level of said electrical battery 101 has dropped to for example 80% of said maximum capacity of said electrical battery 101. Said second switch 130 may optionally be set to a state interrupting the connection between said electrical battery 101 and said permanent supply line, i.e. said permanent power line 132. This setting is selected for example to stop charging, e.g. when said electrical battery 101 is fully charged.

To that end a message 408 is send from said control module 102 to said server 110 containing for example the request to charge, stop charging or discharging or information about the current load in said electrical battery 101.

Upon receipt of said message 408 in a step 409 the test according to step 402 is performed to determine whether said demand for forceful discharging is present. In case a demand for forceful discharge of said electrical battery 101, i.e. to discharge below said predetermined discharge limit threshold is present, said second switch 130 is kept in the state to allow continuously discharging said electrical battery 101 despite the capacity of said electrical battery 101 dropping below said predetermined discharge limit threshold. Otherwise said second switch 130 is set to allow charging of said battery 101 unless said request to stop charging has been received in said message 408. In the latter case said second switch 130 is set to disconnect said electrical battery 101 from said permanent power line 132.

Alternatively in case said message 408 comprises information about said current charging level of said electrical battery 101, said second switch 130 may be set to tcharging level.

Afterwards said first method continues while repeating said steps 402, 404, 407, 408 and 409. This means that said power transfer 406 is controlled until said first method ends. Said first method ends for example when a disconnection of said retractable supply line, e.g. said retractable power cord 131 from said plug 107 is detected.

Said steps 405 or 407 may comprise of verifying said authentication or said authorization of the sender of said message 403. In this case, discharging of said battery 101 is only allowed in cases of successful authorization or authentication.

According to a second example said energy storage of said electrical vehicle is discharged without connection to said power supply system via said retractable supply line. This is particularly advantageous to prevent circumvention of the forceful discharge by unplugging said retractable supply line, e.g. by unplugging said retractable power cord 131 from said plug 107.

Said system for discharging comprises according to said second example said control module 102. Said system comprises additionally a means to dissipate energy. In case of electrical power supply, said means is for example a resistor that may be mounted in said first switch 106 or connectable to said electrical battery 101 via said first switch 106. Said first switch 106 is adapted to connect said plug 107 in a first switch position to said electrical battery 101 or in a second switch position to said means to dissipate energy, e.g. via said resistor. Said first switch position for example provides a direct electrical connection between said battery 101 and said plug 107. Said second switch position for example connects said resistor to said battery 101. To that end said resistor is for example connected permanently to one pole of said electrical battery 101. Said first switch 106 is adapted for example to connect the other pole of said electrical battery 101 to said plug 107 in said first switch position or to said resistor in said second switch position.

Instead of a resistor, any other electrical component using electrical energy when in use may be used.

Said first processor 105 is adapted to switch said first switch 106

Said retractable power cord 131 is connectable to said plug 107 on to other side. Said second processor 111 is adapted to trigger said second switch 130 in a way to allow either charging or discharging of said battery 101 when said retractable power cord 131 is plugged into said plug 107.

According to said second example said second sender 112 of said server 110 is adapted to send a demand to discharge said energy storage to said first receiver 103 of said control module 102. For example said second sender 112 is adapted to send said demand in a message including information about the reason for the demand. For example a string "stolen car" or "emergency power demand" is sent when the reason for the forceful discharge demand is a stolen car or an emergency power demand respectively. Additionally an authorization or authentication information about a sender of said demand may be included in said message.

According to said second example said control module 102 is adapted to discharge said electrical battery 101 below said predetermined discharge limit threshold upon receipt of said demand from said server 110. Said control module 102 is adapted to receive said demand and determine and store the reason for said demand in storage. In case said demand includes an authorization for authentication of the sender of said demand said control module 102 is adapted to determine the validity of said authentication or authorization for example by comparing the received information about the authenticity for authorization of a sender with information about approved senders that are stored in said storage of said control module 102.

Said information of approved senders may be stored in said control module 102 in an encrypted way during the manufacturing of said control module 102.

Additionally or alternatively, said control module 102 furthermore may comprise of means to make a non-destructive modification of said control module 102 difficult. For example said control module 102 comprises a housing, embedding said first processor 105, said storage, said first switch 106, said plug 107, said first receiver 103, and said first sender 104 in a way that any attempt to modify said control module 102 would result in a complete failure of said control module 102, hence disabling the ability to charge said electrical battery 101 via said control module 102.

Furthermore, said server 110 is adapted to add information allowing said control module 102 to verify authenticity or authorization of said sender of said demand. For example, said server 110 is adapted to add said information identifying the sender to said message including said demand.

Authentication or authorization may be verified using public and private key pairs for example according to pretty good privacy standard.

A second method for discharging said energy storage of said vehicle according to said second example is described below making reference to FIG. 4. Said second method starts for example in the same way as said first method.

After the start said message 401 and said step 402 are executed as describe in said first method.

In cases said predetermined condition is met or in case said local power grid requires emergency power supply from attached electrical batteries 101 the demand for forceful discharging of said electrical battery 101 beyond said predetermined discharge limit threshold is sent to said control module 102 in said message 403 reply.

In case said condition is not met a confirmation that charging of said electrical battery 101 is allowed is sent to said control module 102 in said message 403 to said control module 102.

Said step 404 is executed as describe in said first method.

In a modification 405' to said step 405 of said first method, said first switch 106 is set to said first position allowing charging or discharging of said electrical battery 101, in case a confirmation to charge said electrical battery 101 has been received in said message 403. In case said demand for forceful discharge of said electrical battery 101 has been received in said message 403, according to said second method said first switch 106 is set to said first position while a connection between said retractable power cord 131 and said plug 107 is detected by said processor 105. Furthermore said reason for said demand is stored. For example depending on the current reason for said demand said string "stolen car" or "emergency power demand" is stored. Furthermore a test is performed to determine if said retractable power cord 131 is connected to said plug 107.

To that end the connection between said connector of said retractable power cord 131 and said plug 107 is monitored by said first processor 105.

In case no disconnection was detected, said first switch 106 is switched into said first switch position. This means that said power transfer 406 between said electrical battery 101 and said local power grid is established for example for as long as said connector is plugged into said plug 107. Then said step 407 is performed as described in said first method. Furthermore steps 402, 404, 405, 407 and 409 are repeated. This means that messages 403 and 408 are repeated with the appropriate content as well.

Upon detection of a disconnection of said retractable power cord 131 said first processor 105 performs the additional step of testing whether said demand for forceful discharge was due to an emergency situation in said power grid or not, e.g. by reading said stored string and determining if the string "emergency power demand" was stored. In case said demand was due to an emergency situation in said power grid, said method ends, otherwise said first switch 106 is set to said second switch position, allowing to dissipate the electrical energy from the electrical battery 101. To that end upon detection by said first processor 105 of a removal of said connector from said plug 107 said first switch 106 is switched into said second switch position, connecting said resistor to said battery 101.

This way it is ensured to discharge said battery 101 below said predetermined discharge limit threshold because when said predetermined condition is met, said first switch 106 is put in the state to allow continuously discharging said electrical battery 101 despite the removal of the retractable power cord 131 from said plug 107.

Afterwards said second method ends.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any sequence diagram represent various processes which may be a computer program or substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for discharging an energy storage of a vehicle having a predetermined discharge limit threshold, said method comprising:
    performing a lookup in a database to determine whether a predetermined condition is met, wherein said predetermined condition comprises a specific vehicle identification number being listed in said database; and
    initiating the discharging of said energy storage below said predetermined discharge limit threshold depending on a result of said lookup in said database.

2. The method according to claim 1, wherein identification information about said vehicle is received at a server of a supply system from a control module mounted on said vehicle, and wherein said predetermined condition depends on said identification information about said vehicle, and said result of said lookup in said database is sent from said server to said control module.

3. The method according to claim 2, wherein energy is supplied to said energy storage only if said predetermined condition is not met.

4. The method according to claim 2, wherein said control module comprises means adapted to cause a failure of said control module upon an attempt to modify said control module.

5. The method according to claim 1, wherein said predetermined condition is met when information indicating theft of said vehicle is available.

6. The method according to claim 1, wherein said predetermined condition is met when an energy demand of a local supply network to which said energy storage is connected exceeds available energy supply.

7. A non-transitory computer program for discharging an energy storage of a vehicle wherein said computer program, when executed on a computer, causes the computer to perform the steps of the method according to claim 1.

8. A non-transitory computer readable medium having computer executable instructions for performing steps comprising the method according to claim 1.

9. The method according to claim 1, wherein said energy storage comprises an electric battery and said vehicle comprises an electric vehicle.

10. The method according to claim 1, wherein said predetermined discharge limit threshold is below a maximum capacity of said energy storage.

11. A control module for discharging an energy storage of a vehicle having a predetermined discharge limit threshold, comprising:
    a receiver adapted to receive a demand to discharge said energy storage below said predetermined discharge limit threshold; and
    means to initiate the discharging of said energy storage below said predetermined discharge limit threshold upon receipt of said demand;
    wherein said means comprise a processor and a switch, and wherein said processor is adapted to switch said switch to a position allowing to discharge said energy storage beyond said predetermined discharge limit threshold only if said demand is received.

12. The control module according to claim 11, wherein said demand to discharge said energy storage comprises information for authorization or authentication of a sender of said demand, and wherein said control module comprises a processor adapted to verify said authorization or authenticity and to discharge said energy storage only after successful verification of said authorization or authenticity.

13. The control module according to claim 11, wherein said control module is adapted to cause a failure of said control module upon an attempt to modify said control module.

14. A server forming part of a supply system for discharging an energy storage of a vehicle having a predetermined discharge limit threshold, wherein said server is adapted to:
    perform a lookup in a database to determine whether a predetermined condition is met, wherein said predetermined condition comprises a specific vehicle identification number being listed in said database; and
    initiate to discharge said energy storage below said predetermined discharge limit threshold, depending on a result of said lookup in said database.

15. The server according to claim 14, wherein said server is adapted to receive identification information about said vehicle from said control module, and to evaluate said predetermined condition depending on said identification information about said vehicle.

16. The server according to claim 14, wherein said demand to discharge said energy storage comprises an authorization or authentication of a sender adapted to be checked by said control module to verify authorization or authenticity of said sender.

17. A system for discharging an energy storage of a vehicle having a predetermined discharge limit threshold, comprising:
    a receiver adapted to receive a demand to discharge said energy storage below said predetermined discharge limit threshold; and
    means to initiate the discharging of said energy storage below said predetermined discharge limit threshold upon receipt of said demand; wherein a server forming part of a supply system, comprises a processor adapted to perform a lookup in a database to determine whether a predetermined condition is met, wherein said predetermined condition comprises a specific vehicle identification number being listed in said database; and
a sender adapted to send a demand to discharge said energy storage below said predetermined discharge limit threshold, in particular a message to said control module, depending on a result of said lookup in said database.

* * * * *